Dec. 26, 1967 C. D. SNELLING 3,359,971
HEATING SYSTEM FOR TANK TRANSPORT OF LIQUIFIED MATERIALS
Filed May 20, 1966 2 Sheets-Sheet 2
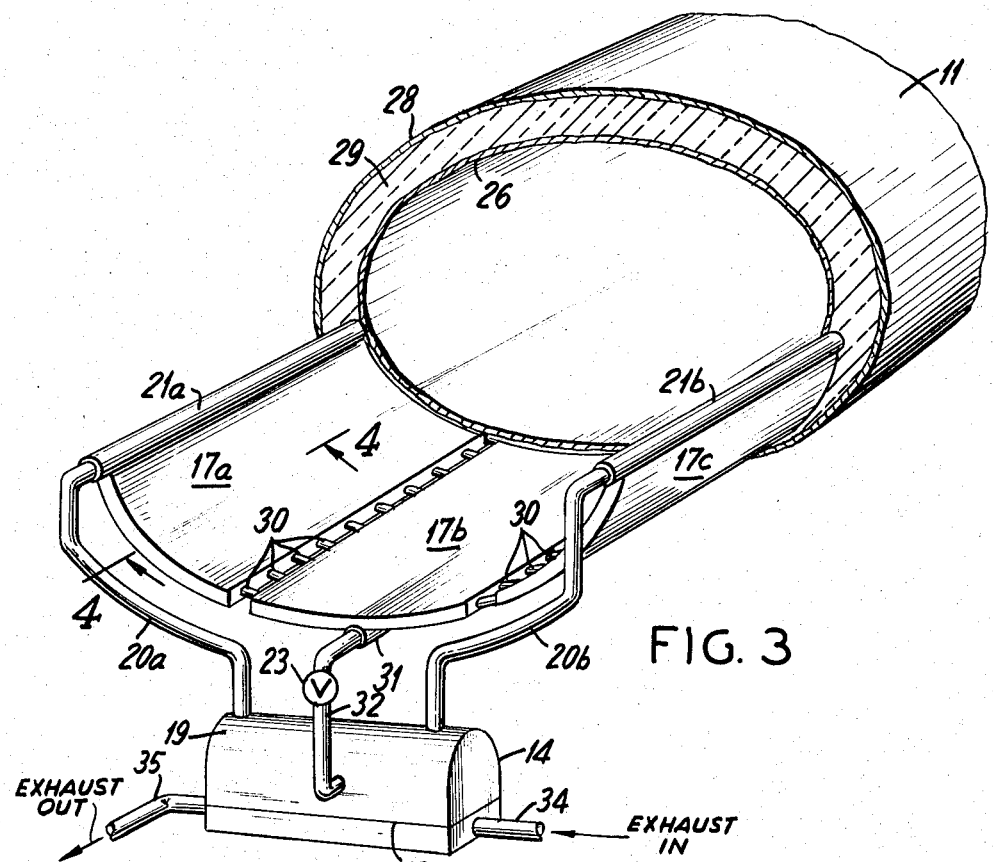
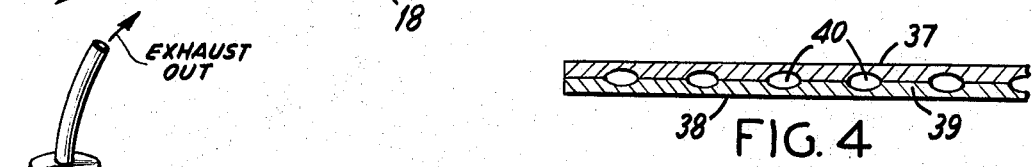
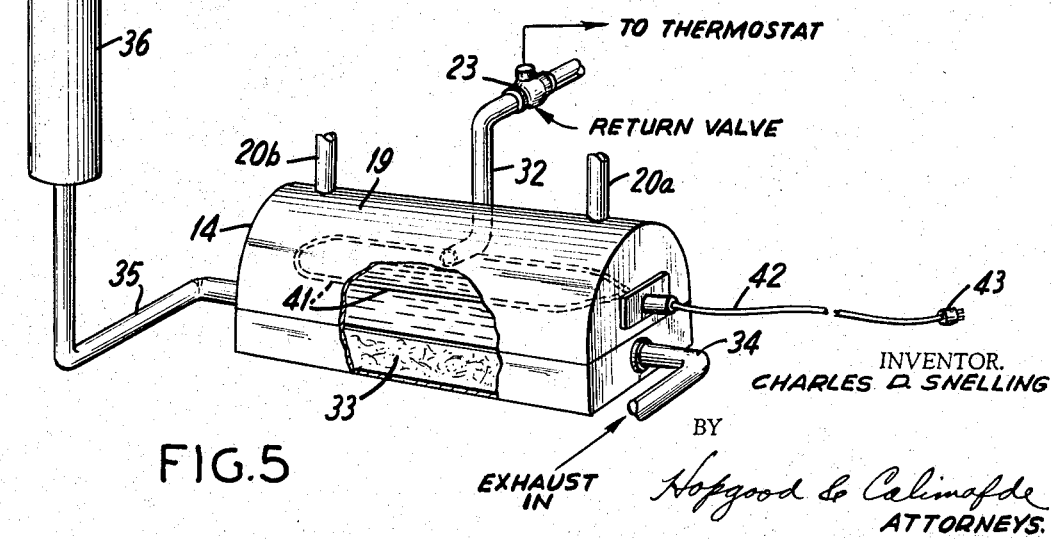
INVENTOR.
CHARLES D. SNELLING
BY
Hopgood & Calimafde
ATTORNEYS.

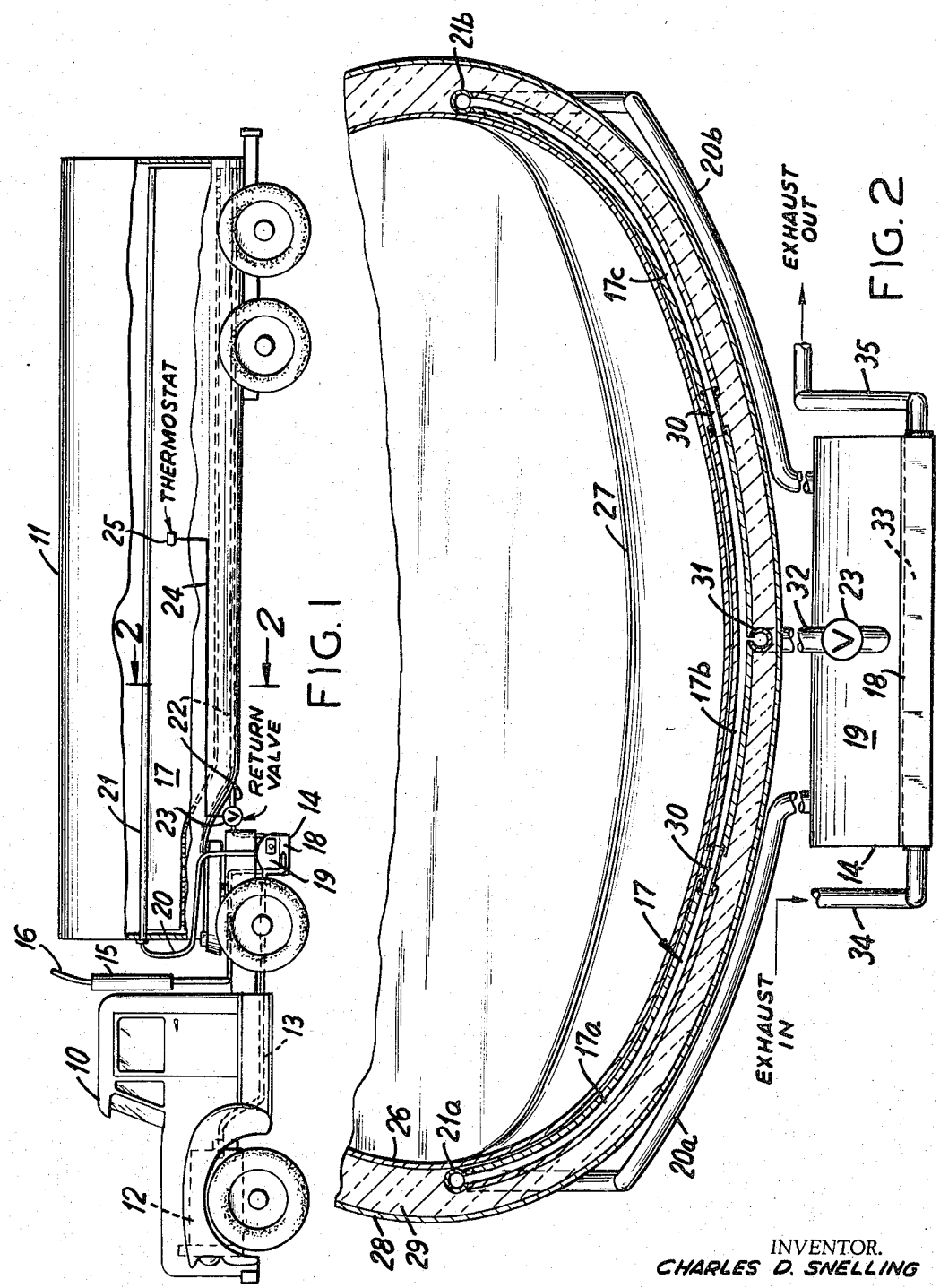

United States Patent Office

3,359,971
Patented Dec. 26, 1967

3,359,971
HEATING SYSTEM FOR TANK TRANSPORT OF LIQUIFIED MATERIALS
Charles D. Snelling, 2949 Greenleaf St., Allentown, Pa. 18103
Filed May 20, 1966, Ser. No. 551,690
5 Claims. (Cl. 126—343.5)

ABSTRACT OF THE DISCLOSURE

A combination transportation tank and heating system is provided for conveying heat sensitive liquids at temperatures above ambient temperatures. The heating system utilizes exhaust waste heat from the engine employed in transporting the tank, for example, such as in a trailer truck. The heating system comprises a condenser in heat conductive relationship with at least the underside of the tank, an evaporator mounted in heat conductive relationship with at least a portion of the engine exhaust means, a heat-transfer circulating system coupling the evaporator to the condenser, the coupling system comprising at least one vapor transfer line from the evaporator to the condenser and a least one fluid return line from the condenser to the evaporator, a predetermined amount of vaporizable heat-transfer fluid hermetically sealed in the circulating system, and a thermostatically operable valve coupled to said liquid return line adapted to control the flow of fluid from the condenser to the evaporator in accordance with the temperature requirements of the tank.

---

This invention relates to a heating system for mobile containers and in particular, to a self-controllable heating system for transport tanks, for example, trailer mounted transport tanks.

Certain heat sensitive substances, such as paraffin, lard, tar, oils, etc., tend to exist in the congealed state at ambient temperatures. The loading and unloading of such substances is greatly enhanced if such substances are shipped in the liquified condition. Because of our diversified economy, it has become increasingly common and important to transport various chemicals, foods, fuels and other congealable substances in large quantities under special temperature conditions. These materials are generally transported by trailer truck and because of their physical nature must be kept warm or hot. Such heat sensitive substances include syrups (e.g., karos, molasses, and the like), certain fats and oils (for example, lard), certain tars and many chemicals too numerous to mention. The temperatures required may be those sufficient to maintain such substances at above 32° F. in the winter and in northern climates where the outside temperature may be as low as —40° F. In other situations, it may be necessary to maintain the substance in the container for long periods of time, e.g., from hours to a week or more at temperatures between 100 and 300° F., for ambient temperatures ranging from 50° F. to 120° F.

Therefore, several means have been provided to accomplish this. Trucks are frequently and usually insulated and may depend wholly on the original heat content of the substance or alternate means of heat may be provided. Frequent use is made of a gas burner or other fuel burner which provides a flame at the bottom of the tank. Another method involves the wrapping of the truck's exhaust pipe around the tank. Although many methods have been proposed, none is completely satisfactory and many leave much to be desired. For example, most of the present systems involve the use of additional and alternate fuels. The burning of gasoline and the use of direct flames are hazardous and lead to accidents and fires. The product may overheat and be damaged, or the fuel may be exhausted or the flame go out and the product and equipment damaged by freezing. With present methods, uniform distribution of the heat is often difficult and unsatisfactory, with localized overheating and underseating resulting. This occurs especially where the product is a viscous fluid. Attempts to overcome this have involved passing tubes through the product and using pumps, fans, etc. The systems which involve the use of exhaust pipes wrapped around the tank generally result in poor temperature control and in localized overheating.

Although many methods and devices have been proposed to overcome the problems and disadvantages inherent in the direct heating of substances, in general such proposals have left much to be desired.

It is thus the object of my invention to provide a heating system for use in maintaining congealable substances in the liquified state during transportation, for example, by trailer truck or tank car.

Another object is to provide a heating system for shipping containers which can be easly controlled whereby any deleterious modification in the chemical or physical makeup of the substance caused by temperature variations is greatly inhibited.

A still further object is to provide a heating system for mobile shipping containers wherein the exhaust gases of an engine-driven vehicle transporting the container is used as the source of heat, but which heating system is capable of controlling the amount of heat transferred to the container despite the amount of excess heat available at the exhaust.

These and other objects and advantages will more clearly appear from the following disclosure when taken in conjunction with the accompanying drawing, wherein:

FIG. 1 is a view in elevation of a trailer truck having an insulated liquid-conveying tank;

FIG. 2 is a section of the tank taken along line 2—2 of FIG. 1;

FIG. 3 is illustrative of one form of heat exchanger and condenser utilized in the heating system provided by the invention;

FIG. 4 is a cross section of a tube sheet useful as a condenser of the type illustrated in FIG. 3; and FIG. 5 depicts the combination of a heat exchanger (evaporator) in heat-conductive relationship with exhaust means of an engine-driven vehicle of the type shown in FIG. 1.

Stating it broadly, the heating system provided by the invention comprises a condenser in heat-conductive relationship with a liquid-conveying tank, an evaporator mounted in heat-conductive relationship with at least a portion of an engine exhaust means, an evacuated heat transfer-circulating system coupling the evaporator to the condenser. The coupling system comprises at least one vapor transfer line running from the evaporator to the condenser and at least one fluid return line from the condenser to the evaporator. A predetermined amount of vaporizable heat-transfer fluid hermetically sealed in the evacuated circulating system and a thermostatically operable valve is coupled to the liquid line adapted to control the flow of fluid from the chamber to the evaporator in accordance with the temperature requirements of the tank or liquid container.

In carrying out the invention, at least a portion of the underside of the tank and, preferably, the entire lower side of the tank is fitted with a system of sealed and interconnected pipes and tubes. Although these tubes may be individually fitted, I prefer to use a tube sheet comprising an inflated pair of roll bonded sheets of metal, e.g., aluminum, which are joined together by heat and pressure.

Such tube sheets are made by printing a waffle-like resist on the contacting sides of the sheet and then heat bonding the sheets together along the unprinted areas only. By applying fluid pressure into an opening communicating with the unbonded portions of the sheets, the bonded sheets are caused to inflate only along the unbonded areas, thus producing an intercommunicating grid-like pathway throughout the assembled sheets. Heat exchanges of this type have good thermal efficiency.

The tube sheet condenser is coupled by a circulating system to a heat exchanger which is partitioned so that the engine exhaust passes through one portion of the heat exchanger, while the other portion, which is hermetically sealed, is coupled to the circulating system. Thus, at least one vapor line is connected from the heat exchanger or evaporator to the condenser, preferably to a higher portion of the condenser, while at least one liquid return line completing the circulating system is coupled from preferably the lower portion of the condenser to the heat exchanger. The entire system is evacuated and filled with the proper amount of thermodynamic or heat-transfer fluid, such as the well known refrigerants sold by the trademarks Freon 11 and Freon 113, carbon tetrachloride methylchloride, ethyl alcohol, or similar heat-transfer fluids. By hermetically sealing the fluid in the circulating system, it will develop its own equilibrium pressure at each temperature. Thus, the fluid is capable of being thermostatically controlled at any temperature desired in the tank. For example, hermetically sealed ethyl alcohol can be boiled in an evacuated system at a temperature of 190° F. and a pressure of 23 lbs./in.$^2$.

Some temperatures and vapor pressures (lbs./in.$^2$ absolute) of fluids which may be employed are given as follows:

VAPOR PRESSURE (LBS./IN.$^2$)

| Temp, °F | Ethyl Alcohol | Ethyl Ether | Carbon Tetrachloride | Freon 11 | Freon 113 |
|---|---|---|---|---|---|
| 60 | 0.6 | 7.1 | 1.38 | 10.1 | 4.3 |
| 68 | 0.85 | 8.5 | 1.75 | 10.3 | 5.1 |
| 77 | 1.14 | 10.3 | 2.22 | | |
| 86 | 1.5 | 12.4 | 2.74 | | |
| 95 | 2.0 | 14.6 | 3.4 | 20.1 | 9.4 |
| 104 | 2.6 | 17.7 | 4.15 | | |
| 122 | 4.75 | 24.5 | 6.2 | 30.4 | 16.0 |
| 131 | 5.4 | | 7.3 | 39.1 | 18.5 |
| 140 | 6.8 | 33.2 | 8.65 | | |
| 149 | 8.65 | | 10.2 | 50.5 | 24.5 |
| 158 | 10.42 | 43.9 | 12.0 | | |
| 172 | 14.6 | | 14.0 | 70.0 | 30.2 |
| 176 | 15.6 | 57.6 | 16.1 | | |
| 194 | 23.0 | 73.8 | 21.4 | 98.0 | 50.0 |

As will be noted from the above, a fairly wide range of evaporation temperatures is possible over a fairly low range of pressures.

By utilizing a closed circuit heat transfer system of the type described hereinabove, when heat is called for, the evaporator will be flooded with the heat-transfer fluid and the condenser filled with vapor. Preferably, the liquid line is arranged so that the condensed fluid flows by gravity to the evaporator. Or, if necessary, a small liquid return pump can be used.

The advantage of using a thermostatically controllable valve in the fluid return line is that when the desired tank temperature has been reached, the valve closes so that no further fluid flows back to the evaporator. Any residual fluid in the evaporator is then completely evaporated, after which heat transfer ceases until the valve opens. Thus, even though the temperature of the exhaust might be relatively high, it can have no effect on the substance in the tank so long as there is no heat transfer between the exhaust and the tank. As will be appreciated, my system is capable of precise control as compared to the systems heretofore employed.

Referring to FIG. 1, a trailer truck is depicted comprising a tractor or vehicle 10 and an insulated trailer tank 11 coupled to a vehicle as shown. The engine 12 of the vehicle is indicated in dotted lines and has extending from it an exhaust line 13 which passes through the bottom portion of a heat exchanger 14 and from thence through an exhaust muffler 15 to exit pipe 16.

The trailer tank 11 which is partially broken away has a condenser 17 in heat conductive contact with its underside, the condenser being preferably of tube sheet construction as described hereinbefore, although a similar effect can be achieved using a network of circulating pipes. The heat exchanger 14 is partitioned at 18, whereby to provide an evaporator compartment 19 which has leading from it at least one vapor line 20 coupled to a vapor manifold 21 of the condenser, the condenser having a fluid return line 22 which is also coupled to the evaporator after passing through thermostatically controlled valve 23. The valve is connected via a tube 24 to a pressure thermostat or bulb 25, it being appreciated that other types of thermostats can be employed. For example, the thermostat might comprise an electrical circuit which operates a solenoid-actuated valve. In any event the term "thermostatically operable valve" is meant to include any type of control, whether based on temperature or pressure variations in the system.

FIG. 2 is a more detailed rendition of the circulating system as viewed in cross-section along line 2—2 of FIG. 1 showing the trailer tank with an oval cross-section having an inner metal shell 26, the bottom 27 tapering upward so as to rest upon the back of the vehicle as shown on FIG. 1. The tank has an outer shell 28 spaced from the inner shell by insulating material 29 of asbestos or other equivalent insulation.

Adjacent the bottom of the tank in substantially contacting relationship therewith is condenser 17 comprising three connecting tube sheet sections, 17a, 17b and 17c (note also FIG. 3), the sections being interconnected by nipples 30. A pair of vapor lines 20a and 20b is shown coupling the heat exchanger 14 to the uppermost portions of the condenser via manifolds 21a and 21b. A liquid return manifold 31 is provided coupled to liquid return line 32 which in turn is coupled to evaporator 19 as shown.

Heat exchanger 14 is partitioned at 18 whereby to provide a compartment 33 through which hot exhaust gases are fed via entering exhaust line 34 and removed via line 35, the exhaust passing through muffler 36 (note FIG. 5) and out into the atmosphere.

The component parts making up the circulating system are more clearly shown in the sectional three-dimensional view of FIG. 3. While, as stated above, I prefer to use a condenser made from tube sheets, I do not wish to be so limited since the condenser can take other forms. The tube sheets shown in FIG. 3 are of simple form as depicted by FIG. 4 which is a cross-section taken along line 4—4 of FIG. 3. The tube sheet there illustrated comprise two bonded sheets of metal 37 and 38 bonded at interface 39, except for openings or pathways 40 running through the sheet. The pathways may be straight or interwind throughout the bonded sheets. Because high heat conductivity is desirable, I prefer to use a condenser made from aluminous (i.e., aluminum or aluminum-base alloys) or cuprous (i.e., copper or copper-base alloys) metals.

As will be apparent from the foregoing, my system has many advantages. First and foremost, it is a dependable, reliable truck heating system. It can be manufactured inexpensively from aluminum, copper, steel, or many other metals. It is self-powered, and as long as the truck engine is running requires no auxiliary fuel or cost. Since it involves no flame or liquid fuels, it is safe. This is very important and, because of the thermodynamic method of heat transfer, the system enables the distribution of heat uniformly throughout the condenser and, therefore, the tank. The tank can be completely surrounded by the condenser, if this is desirable, or actually made of condenser plates if this is necessary. Hot spots are avoided, and any cold spot will condense more vapor and, hence, receive more heat than any other spot in the tank. Even the most viscous liquid in the tank can be uniformly and gently heated and kept warm. A pressure relief valve or blowout plug can be employed in the system to prevent any overheating of the contents of the tank, no matter what malfunction occurs in the system. My system is very convenient and flexible. If desirable, concentrated electrical heat or a calrod unit for any desired voltage may be built right into the evaporator, so that when the truck is standing or broken down or parked overnight, it can be connected to any electrical supply to maintain the temperature. Such a unit 41 is shown in FIG. 5 having means for connecting to a source of electricity via plug 43. Or, if desirable, a propane or gas burner may be utilized at the evaporator where there is standby or layover of the trailer truck so that the engine is not running. Even under such conditions, and with the use of a fuel burner, my system maintains its advantages of even, uniform, temperature distribution and complete safety from overheating whether localized or generalized.

My evaporator can be located a number of places, but I prefer one of two locations. It may be located on the tractor relatively low down and near the rear, in which case the heat exchanger-evaporator may form a permanent part of the tractor's exhaust system. The fluid reservoir may be arranged to hold the thermodynamic fluid when the system is not in operation. Under such circumstances, I may use a thermodynamic fluid which is under pressure at ordinary ambient conditions and quick-disconnect liquid-and vapor-tight self-sealing flexible hoses for both the liquid and vapor lines to interconnect with the trailer. These lines would be relatively similar to those which are used in hydraulic systems for quick-connect and disconnect without loss of fluid pressure or vacuum by means of O-ring collars with self-sealing pour valves.

The other location for the evaporator is that it may be mounted on the trailer itself in a low down and forward location. This is preferable since vapor and liquid disconnect lines are not required. In this case, the exhaust pipe of the tractor's engine, between the engine and the muffler, is provided with a special fitting so that when the fitting is inserted, it directs the flow of hot gases that would normally go to the muffler instead into the flexible, insulated tube which runs to the evaporator on the trailer and thence back through another tube from whence the flow is returned to the muffler. In other words, when the double tube fitting is not employed, the gases flow directly from the engine to the muffler; but when it is inserted, the gases flow from the engine through the fitting through the flexible pipe to the evaporator on the trailer and then back through another flexible pipe through the fitting and into the exhaust pipe to the muffler. A proper arrangement would involve little or no increase in back-pressure for the tractor engine.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. The combination of a transportation tank and a heating system for conveying heat sensitive liquids at temperatures above ambient temperatures wherein an engine-driven device is used to transport said tank, said engine having exhaust means for exhausting hot waste gases, said heating system comprising a condenser in heat conductive relationship with at least the underside of said tank, an evaporator mounted in heat conductive relationship with at least a portion of said engine exhaust means, a heat-transfer circulating system coupling said evaporator to said condenser, said coupling system comprising at least one vapor transfer line from said evaporator to said condenser and at least one fluid return line from the condenser to said evaporator, a predetermined amount of vaporizable heat-transfer fluid hermetically sealed in said circulating system, and a thermostatically operable valve coupled to said liquid return line adapted to control the flow of fluid from said condenser to said evaporator in accordance with the temperature requirements of said tank.

2. The heating system of claim 1 wherein the heat-transfer circulating system is an evacuated system and wherein said heat transfer fluid is hermetically sealed to said evacuated circulating system.

3. The heating system of claim 2 wherein said fluid return line is in gravity-feeding relationship to said evaporator.

4. The heating system of claim 3 wherein the thermostatically operable valve is operated via a thermostat strategically placed near the contents of the tank.

5. The heating system of claim 1 wherein the condenser is formed of at least one tube sheet section.

References Cited

UNITED STATES PATENTS

| | | | |
|---|---|---|---|
| 2,107,199 | 2/1938 | Gaugler | 165—105 X |
| 3,143,108 | 8/1964 | Rogers | 126—343.5 |

CHARLES J. MYHRE, *Primary Examiner.*